United States Patent Office

3,635,867
Patented Jan. 18, 1972

3,635,867
POLYMERIZATION PROCESS FOR MAKING AQUEOUS ACRYLIC-CONTAINING EMULSIONS
Ernest Clark Yuille, Louisville, Ky., assignor to Celanese Coatings Company, New York, N.Y.
No Drawing. Filed Dec. 5, 1967, Ser. No. 687,969
Int. Cl. C08f 1/84, 15/00
U.S. Cl. 260—29.4 UA          8 Claims

ABSTRACT OF THE DISCLOSURE

A process for producing the improved aqueous acrylic-containing emulsions for blister resistant paints and to the products thereof prepared by the addition of an amino resin prior to or during the polymerization, in an aqueous solution, of an alkyl ester of a polymerizable alpha beta unsaturated monocarboxylic acid and a monomer containing a single $H_2C=C$ group. The polymerization occurs in the presence of a polymerizable unsaturated carboxylic acid, a catalytic amount of a free radical polymerization catalyst and a surfactant. The interpolymer formed is capable of continuous film formation at 40° C. or below.

---

This invention relates to a unique procedure for producing improved aqueous emulsions used in the formulation for blister resistant paints and to the compositions produced by this process. More particularly, this invention relates to a process utilizing an unusual feature of adding an amino resin prior or during the polymerization of acrylic-containing emulsion monomers and obtaining stable aqueous acrylic interpolymer emulsions with exceptional properties for blister resistance and wet adhesion in paint formulations.

Aqueous emulsions containing various homopolymers and copolymers, e.g., homopolymers and copolymers of vinyl acetate, homopolymers and copolymers of lower alkyl acrylates and methacrylates, such as ethyl acrylate and methyl methacrylate, and the like, have been known for many years. The procedures used to prepare such polymer emulsions generally involve adding, under rapid stirring, one or more ethylenically unsaturated monomers to water which contains or to which there is added, either simultaneously or subsequently, surfactants or emulsifying agents, a polymerization catalyst or initiator, and, in many cases, a protective coloid-forming substance. This mixture is then heated to polymerization temperature, with continued stirring, and held at that temperature for the time necessary to substantially completely polymerize the monomer or monomers and form the polymer emulsion. The resulting emulsion, upon cooling and filtering, can be used in many domestic and industrial applications, such as in paints or other coating compositions, e.g., paper coatings and textile-treating compositions, in adhesives or binders, in caulking compositions, and the like, depending on the particular polymers involved and the properties of the emulsions containing them.

Acrylic polymer emulsions, and particularly those which contain emulsion polymers prepared using a predominant amount of a lower alkyl acrylate together with minor amounts of other comonomers, e.g., styrene, alkyl methacrylates, higher alkyl acrylates, acrylic or methacrylic acid, vinyl and vinylidene halides, and the like, have come to be used in ever increasing amounts in recent years in the so-called water-base paints. Films of such polymers normally exhibit excellent appearance and durability, particularly when pigmented, but paints or other coating compositions containing them do not, generally provide good wet adhesion properties and blister resistance.

An unusual process has now been discovered which provides aqueous acrylic emulsions which when formulated with pigments provides paints which exhibit excellent appearance, durability as well as outstanding wet adhesion properties and blister resistance. This process utilizes the unexpected addition of an amino resin prior to or during the polymerization, in an aqueous emulsion, of an alkyl ester of a polymerizable alpha beta unsaturated monocarboxylic acid and a monomer containing a single $CH_2=C<$ group; the polymerization occurs in the presence of a polymerizable alpha beta unsaturated carboxylic acid, a catalytic amount of a free radical polymerization catalyst and a surfactant; under acceptable polymerization temperature conditions the interpolymer formed is capable of continuous film formation at 40° C. and below. The temperatures which are used in the polymerization range from about 25° C. to 100° C. preferably in the range from about 50 to about 75° C. Subsequent to the polymerization, the emulsion product is maintained or neutralized to a pH in the range from about 7 to about 10. It is indeed surprising to provide a stable aqueous acrylic-containing aqueous emulsion which has improved properties when the cross-linking agent is present or incorporated during the polymerization reaction.

One of the major monomer components of these aqueous emulsion polymers is an alkyl ester of a polymerizable alpha beta unsaturated monocarboxylic acid having the formula:

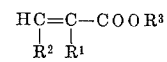

wherein $R^1$ and $R^2$ are hydrogen or an alkyl radical containing 1 or 2 carbon atoms, and $R^3$ is an alkyl radical containing from 1 to 10 carbon atoms. The typical monomers falling within this description include, among others: methyl acrylate, ethyl acrylate, propyl acrylate, n-butyl acrylate, isobutyl acrylate, 2-ethylhexyl acrylate, methyl methacrylate, ethyl methacrylate, isobutyl methacrylate, 2-ethylhexyl methacrylate, etc.

The other monomer or monomers of the polymer is described as containing a single $CH_2=C<$ group and is selected on the basis so that the interpolymer formed with the monomers used herein is capable of forming a continuous film at about 40° C. preferably at room temperature or below. The determination of minimum film formation temperature is defined in the standard test ASTM designation D 2354–65T issued 1965. Besides being copolymerized with each other, the aforementioned monomeric acrylates can also be copolymerized with one or more different monomers, and in fact for many industrial applications copolymers with functional group-containing monomers, and especially ones which provide sites for subsequent cross-linking, will be preferred.

Included among these different comonomers are higher alkyl esters of acrylic and methacrylic acid, i.e., those having from 10 to 22 or more carbon atoms in the ester moiety, such as decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl lauryl methacrylate.

Derivatives of the hypothetical vinyl alcohol, e.g., aliphatic vinyl esters such as vinyl formate, vinyl acetate, vinyl propionate, vinyl butyrate, vinyl isobutyrate, vinyl valerate, vinyl caproate and the vinyl ester of versatic acid can be employed in amounts ranging up to about 90% or more by weight, based on the total weight of monomers used, as can allyl esters of saturated (which includes polymerizably non-reactive unsaturation) monocarboxylic acids, e.g., allyl acetate, allyl propionate and allyl lactate, with the latter esters generally being used in relatively small amounts together with larger amounts of one or more different vinyl monomers, and especially aliphatic vinyl esters such as vinyl acetate.

Aliphatic vinyl ethers such as methyl vinyl ether, ethyl vinyl ether and n-butyl vinyl ether can also be employed, as can vinyl ketones, such as methyl vinyl ketone, ethyl vinyl ketone and isobutyl vinyl ketone, and dialkyl esters of monoethylenically unsaturated dicarboxylic acids, e.g., diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Additional comonomers include vinyl aromatic compounds, such as styrene, vinyl toluene, alpha methyl styrene and the like, as well as nitriles and the unsubstituted amides and substituted (including N-substituted) amides of polymerizable ethylenically unsaturated mono- and polycarboxylic acids.

Among the nitriles which can be employed are acrylonitrile and methacrylonitrile, while among the amides are unsubstituted amides such as acrylamide, methacrylamide and other alpha substituted acrylamides, and N-substituted amides obtained by reacting the amides in known manner with an aldehyde such as formaldehyde or the like, e.g., N-methylolacrylamide, N-methylolmethacrylamide, alkylated N-methylolacrylamides and N-methylolmethacrylamides such as N-methoxymethylacrylamide, N-methoxymethylmethacrylamide and the like.

Amino monomers which can be used include substituted and unsubstituted aminoalkyl acrylates and methacrylates such as aminomethylacrylate, beta-amino-ethylacrylate, aminomethylmethacrylate, beta-amino-ethylmethacrylate, dimethylaminomethylacrylate, beta-dimethylaminoethylacrylate, dimethylaminoethylmethacrylate, beta-dimethylaminomethylmethacrylate, tertiary, butyl aminoethyl methacrylate and the like, while among the hydroxyl-containing monomers which can be used are beta-hydroxyethylacrylate, beta-hydroxypropylacrylate, beta-hydroxyethylmethacrylate and the like.

The preferred interpolymers of this invention include butyl acrylate and methyl methacrylate and ethyl acrylate and methyl methacrylate.

An essential portion of the polymer composition of this invention is the presence of a polymerizable alpha beta unsaturated carboxylic acid. Such acids include monoethylenically unsaturated monocarboxylic acids, such as acrylic acid, methacrylic acid, ethacrylic acid and crotonic acid; monoethylenically unsaturated dicarboxylic acids, such as maleic acid, fumaric acid, itaconic acid and citraconic acid, and the half esters of these acids, such as methyl hydrogen fumarate, benzyl hydrogen maleate, butyl hydrogen maleate, octyl hydrogen itaconate and dodecyl hydrogen citraconate, i.e., half esters wherein the reacted alcohol portion contains 1 to about 20 carbon atoms; and monoethylenically unsaturated tricarboxylic acids, such as aconitic acid. Such acids include the halogen substituted (e.g., fluoro-, chloro-, and bromo-substituted) derivatives, e.g., alpha chloro-acrylic acid, and the anhydrides of these acids, if available, e.g., maleic anhydride and citraconic anhydride.

The preferred acids, which are an essential portion of the polymer composition of this invention are polymerizable alpha beta unsaturated carboxylic acids having the formula:

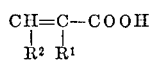

wherein $R^1$ is hydrogen or an alkyl radical containing 1 or 2 carbon atoms and $R^2$ is hydrogen, an alkyl radical containing 1 or 2 carbon atoms or a carboxy group. Among such acids are acrylic; methacrylic; alpha, beta dimethyl acrylic, ethacrylic, crotonic, isocrotonic, angelic, tiglic and the like.

The additives which are added prior to or during the polymerization of the monomers include the amino resins. This terminology includes the condensation products of urea-formaldehyde and melamine-formaldehyde resins. These include not only resins themselves but the individual components of these resins such as moonmethylol urea, dihydroxy dimethylol ethylene urea, dimethylol urea, dimethoxy methyl urea, dimethylol ethylene urea, butoxymethylhydroxymethyl urea, alkyl methylol melamines and the like. Appropriately, resins produced from urea-formaldehyde and melamine-formaldehyde condensation products are also suitable. The preferred additives are the condensation products of urea-formaldehyde which are water soluble. The additives which are used are known as cross-linking agents for coatings compositions.

The amounts of monomers such as the interpolymers of alkyl acrylates and monomer containing a single $H_2C=C<$ group which can be used can range from about 75 to about 98.5 percent by weight of the monomers used, free of water, preferably from about 90 to about 98.5 percent. The polymerizable alpha beta unsaturated carboxylic acid can be present in amounts ranging from 0.5 to about 6 weight percent, preferably 0.75 to 2 weight percent based on the monomers used, free of water content. The amino resin can be present in amounts ranging from about 0.25 to about 10 weight percent preferably from about 1 to about 5 weight percent based on the total monomers.

The process of this invention can be carried out in one of many ways. For example, the amino resin cross-linking agent can be added to the reaction vessel prior to the addition of the monomeric materials used in the polymerization or the amino resin can be added with the reactants over a delayed period of time. Furthermore, the monomers used in the reaction can be formed as preemulsions to which the amino resin can be added so that the combination of materials are all present in polymerization reaction or the reaction used can contain the amino resin while the preemulsions are added for polymerization. In any event, superior properties relating to wet adhesion and blister resistance are obtained from the paints formulated with the aqueous acrylic emulsions in which the amino resin was added prior to or during the polymerization of the monomers. When the amino resin was added to the polymerized emulsion (i.e., added after the polymerization has been completed) the superior properties of the paints using these emulsions are not available.

The surfactants which can be used in the process of this invention can include, any anionic or non-ionic surfactant (which can also be termed an emulsifying agent, a dispersing agent or a wetting agent), or mixtures thereof, which can be employed in preparing conventional acrylic polymer emulsions.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, which series can be represented by the general formula

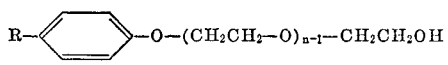

wherein R represents an alkyl radical and $n$ represents the number of mols of ethylene oxide employed, included among which are alkylphenoxypoly(ethyleneoxy)ethanols having alkyl groups containing from about 7 to about 18 carbon atoms, inclusive, and having from about 4 to about 240 ethyleneoxy units, such as the heptylphenoxypoly(ethyleneoxy)ethanols, nonylphenoxypoly(ethyleneoxy) ethanols and dodecylphenoxypoly(ethyleneoxy) ethanols; the "Tweens," which are polyoxyalkylene derivatives of hexitol (including sorbitans, sorbides, mannitans and mannides) anhydride partial long chain fatty acid esters, such as the polyoxyalkylene derivatives of sorbitan monolaurate, sorbitan monopalmitate, sorbitan monostearate, sorbitan tristearate, sorbitan tristerate, sorbitan monoleate and sorbitan trioleate; the "Pluronics," which are condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl dodecyl or tetradecyl mercaptan, or with alkylthiophenols wherein the alkyl group contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohol such as octyl, decyl, lauryl, or cetyl alcohol.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate, higher fatty alcohols, e.g., stearyl, lauryl, etc. which have been ethoxylated and sulfonated, dialkyl esters of alkali metal sulfosuccinic acid salts, such as sodium diamyl sulfosuccinate, sodium dihexyl sulfosuccinate and sodium dioctyl sulfosuccinate, and formaldehydenaphthalenesulfonic acid condensation products.

The amount of surfactant employed in the emulsion polymerization process, will range in an amount from about 0.02 to about 10% by weight, based on the total weight of the monomers and this can be the case whether a non-ionic surfactant is employed. However, it is preferred when using typical non-ionic surfactants, e.g., those of the above-described alkylphenoxypoly(ethyleneoxy) ethanols which contain from about 30 to about 100 ethyleneoxy units, or typical anionic surfactants, e.g., an ethoxylated higher fatty alcohol which has also been sulfonated, to employ them in amounts ranging from about 0.1 to about 6% by weight, on the above-stated basis.

Aside from the surfactant or surfactant mixture employed the monomer reactants can also contain small amounts of one or more protective colloids, particularly when a reflux-type polymerization is carried out using vinyl acetate or the like as part of the monomer charge. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelatin, water soluble alginates such as sodium or potassium alginate, casein, agar, and natural and synthetic gums, such as gum arabic and gum tragacanth. All of these materials will be used in the amounts found in conventional emulsion polymerization procedures, i.e., in amounts usually ranging from about 0.1% to about 2% by weight, based on the total weight of the polymer emulsion.

The monomer or monomers will be polymerized by means of a catalytic amount of a conventional free radical polymerization catalyst or catalyst system (which can also be referred to as an addition polymerization catalyst, a vinyl polymerization catalyst or a polymerization initiator), preferably, although not necessarily, one which is substantially water soluble. Among such catalysts are inorganic peroxides such as hydrogen peroxide, alkali metal (e.g., sodium, potassium or lithium) and ammonium persulfates, perphosphates and perborates, azonitriles, such as α,α-azobisisobutyronitrile, and redox systems, including such combinations as mixtures of hydrogen peroxide, t-butyl hydroperoxide, or the like and any of an iron salt, a titanous salt, zinc formaldehyde sulfoxylate or sodium formaldehyde sulfoxylate; an alkali metal or ammonium persulfate, borate or perchlorate together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be no more than that required to obtain substantially complete monomer conversion at lowest catalyst cost.

It is also possible, when using redox catalyst systems, to dissolve the oxidant, e.g., ammonium persulfate, in the surfactant-water mixture prior to the preparation of the monomer pre-emulsion, and to then add the reductant, together with the oxidant-containing monomer pre-emulsion, to the water in which it will be polymerized.

The amount of water to which the monomers are added will be determined by the solids content desired in the finished polymer emulsion. These solids content can range from as low as 20 percent to as high as 80 percent or higher.

The polymerization temperature will generally range from room temperature or lower to about 100° C. or above, and preferably from about 50° C. to about 75° C., and can be varied as the final polymerization proceeds towards substantial completion. Subatmospheric, atmospheric or superatmospheric pressures can be employed during all or part of the polymerization, and depending on the monomers and catalyst employed the reaction can be carried out, if desired, under an inert atmosphere, e.g., under an inert nitrogen or carbon dioxide atmosphere. Thus, for example, polymerizations carried out at temperatures 10° C. or more below the boiling point of the lowest boiling monomer present will usually take place under an inert atmosphere.

After the emulsion has been prepared, the reaction product is maintained at a pH between about 7 to 10 or neutralized to this pH or the preferred pH ranging from 8 to 10. In neutralization, any type of base material can be used providing the base does not cause instability to the emulsion. Ammonium hydroxide and concentrated ammonia can be utilized.

The following examples will serve to illustrate the invention hereinabove described without limiting the same.

EXAMPLE 1

In a reaction flask is placed 1825 grams water, 141.5 grams alkylphenoxypoly(ethylenonoxy)ethanol and 36 grams dihydroxy dimethylol ethylene urea. The reaction flask is purged with nitrogen while heating to 60–62° C. To the solution is added 2.7 grams potassium persulfate followed by 30 milliliters of a mixture of 215 grams water and 3.1 grams sodium meta sulfite. The monomers consisting of 1188 grams ethyl acrylate, 588.6 grams methyl methacrylate and 23.4 grams methacrylic acid are begun to constantly feed to the reaction flask over a 3 hour and 15 minute period. The remainder of the sodium meta sulfite is also fed over the 3 hour and 15 minute time period. The reaction temperature was maintained at 60–62° C. during the feed period and after the monomers were completely fed, the reaction temperature was maintained until the residual monomer was below 0.2% level. The reaction product was cooled and a mixture of 25 grams aqueous ammonium hydroxide (28% concentration) and 30 grams of water was added to the reaction product. The pH of the emulsion was adjusted to 9.4–9.7.

For further testing, the above emulsion was formulated into primer and topcoat paints in the following manner:

Primer

| Material: | Pounds |
|---|---|
| Tamol 850 (30%) (dispersant—sodium salt of a polyacrylic acid) | 0.1 |
| Triton X–102 (nonionic surfactant — octyl phenol reacted with 12–13 moles ethylene oxide) | 0.02 |
| Antifoamer | 0.02 |
| Water | 0.81 |
| Ethylene glycol | 0.50 |
| Pine oil | 0.06 |
| Preservative | 0.36 |
| Hydroxyethyl cellulose (2% solution) | 3.5 |
| Rutile titanium dioxide | 4.0 |
| Basic silicate of white lead | 2.5 |
| Calcium carbonate | 2.3 |

The above combination is ground in a high-speed mill (3800–4500 feet per minute for 10–15 minutes). To this combination is added 10.2 pounds of the emulsion made above with 0.02 pounds of antifoamer. The combination of materials is thoroughly mixed and ready for testing.

White top coat

| Materials: | Pounds |
|---|---|
| Water | 1.07 |
| Tamol 731 (25%) (dispersant—sodium salt of a polyacrylic acid) | 0.21 |
| Triton CF–10 (nonionic surfactant—octyl phenol reacted with 12–13 moles ethylene oxide) | 0.05 |
| Antifoamer | 0.02 |
| Ethylene glycol | 0.50 |
| Pine oil | 0.06 |
| Preservative | 0.36 |
| Hydroxyethyl cellulose (2.5% solution) | 2.30 |
| Rutile titanium dioxide | 4.8 |
| Antase titanium dioxide | 0.20 |
| Talc | 2.0 |
| Calcium carbonate | 2.2 |

The above combination is ground in a high speed mill (3800–4500 feet per minute for 10–15 minutes). To this combination is added 10.2 pounds of the emulsion made above with 0.15 pound water, 0.02 pound antifoamer and 0.4 pound ammonium hydroxide (28%). The combination of materials is thoroughly mixed and ready for testing.

The above primer and top coat paints each are applied on one side to a bare cedar panel. One day after application of the top coat, the uncoated side of the panel was exposed to condensing water vapor at 60° C. The paint system was fully blister resistant after 5 days' exposure.

Degree of blistering was rated after 5 days' exposure on the blister box according to A.S.T.M. D714. Blister size is rated on a scale of 1 through 10. Size 8 is the smallest blister easily seen with the unaided eye. A rating of 10 indicates no blistering. The blisters are also given a density rating: few (F) medium (M), medium dense (MD) and dense (D). The adhesion test is carried out utilizing the same test but after the test and the panels are dry. Adhesion is tested by placing masking tape on an area cross hatched diagonally to the wood grain and on uncut area. The adhesion is rated on both areas using a 0–10 scale where 0 is complete failure and 10 indicates perfect adhesion.

The scrub resistance test is carried out in the following manner:

(1) Drawdowns of the test paint(s) and the control are cast across Leneta Scrub Panels with a 3.0 mil (6.0 mil clearance) Bird Applicator (2" wide) and allowed to dry 72 hours at room temperature.

(2) The films are then subjected to the Gardner Straight Line Washability Machine. Before beginning, the brush bristles should be immersed in water at 77°–86° F. for 30 minutes to a depth of one-half inch. Shake the brush to remove the "free" water and then soak the brush an additional 5 minutes in whichever soap solution is being used. The scrubbing cycle may now commence. During the test, permit additional soap solution to drop into the path of the brush at the rate of 12 drops per minute, or just enough to keep the panel wet.

(3) Failure will occur at the time of complete film breakthrough. The number of cycles are counted to failure (abrasion or adhesion). The scrub index is determined in the following manner:

$$\text{Scrub Index} = \frac{\text{cycles of test paint to failure}}{\text{cycles of standard to failure}}$$

The standard in this technique is utilizing an emulsion having no amino resin at any time or post added. Results of the testing of this emulsion are set forth in Table I.

EXAMPLE 2

Utilizing the same quantities of materials and techniques as described in Example 1 except for adding the dihydroxy dimethylol ethylene urea after the polymerization reaction was completed, the results are indicated in Table I below.

EXAMPLE 3

Utilizing the same quantities of materials and techniques as described in Example 1, except for no addition at all of the urea compound, the results are indicated in Table I below.

TABLE I

| | Scrub indices | Blister resistance | | Wet adhesion | |
|---|---|---|---|---|---|
| | | Over alkyd | Self-primed | Over alkyd | Self-primed |
| Example 1 [1] | 1.56 | 9 (very fw) | 10 | Good | Good. |
| Example 2 [2] | 1.18 | 8 (few) | 10 | do | Do. |
| Example 3 [3] | 1.00 | do | 10 | Poor | Poor. |

[1] Pre-addition of urea compound.
[2] Post-addition of urea compound.
[3] No addition of urea compound.

It is indicative by the comparative results of Table I that the preaddition of the dihydroxy dimethylol ethylene urea provides better scrub resistance and blister resistance while maintaining good wet adhesion properties compared to the post-addition and no addition of the urea compound.

EXAMPLE 4

Into a reaction flask is placed 450 grams water and 86.8 grams dihydroxy dimethylol ethylene urea. The reaction flask is purged with nitrogen while heating to 65° C. To the solution is added 4.4 grams potassium persulfate ($K_2S_2O_8$) and 2 minutes later 15 milliliters of a solution made up of 120 grams water and 4.4 grams of sodium metabisulfite ($Na_2S_2O_5$) are added. In a separate flask, a mixture of 1476.0 grams butyl acrylate, 650.6 grams methyl methacrylate and 43.4 grams methacrylic acid are combined and mixed with moderate agitation at room temperature for 30 minutes with a mixture of 450 grams water, 38.8 grams sodium salt of alkylarylpolyether sulfonate and 93 grams nonylphenoxypoly(ethylenoxy)ethanol to form a preemulsion. With the temperature of the aqueous solution at 65° C. in the reaction flask, a delayed addition of the preemulsion solution is begun which is timed to last for a four-hour period. At the same time, the remaining solution of the 4.4 grams sodium metabisulfite and 120 grams water is also fed with the pre-emulsion solution and is timed to last four hours and fifteen minutes. The reaction temperature is maintained at 65±3° C. during the polymerization period. When the delayed feeds are complete, the reaction product is held at 65° C. until the percent of free monomer is 0.2 percent or less. The reaction product is cooled to room temperature while adding dropwise the solution of 35 grams ammonium hydroxide (28 percent ammonia) and 70 grams water. The pH of the emulsion solution was 9.1±0.1. The solids content of the reaction product was 65%±1%.

The above prepared emulsion was evaluated for scrub index, blister resistance and wet adhesion.

EXAMPLE 5

In a similar manner as Example 4 except for the pre-addition of the dihydroxy dimethylol ethylene urea, this material was added after the polymerization was completed. Results of the testing of this emulsion are set forth in Table II.

TABLE II

|  | Scrub indices | Blister resistance | | Wet adhesion | |
|---|---|---|---|---|---|
|  |  | Over alkyd | Self-primed | Over alkyd | Self-primed |
| Example 4 [1] | 1.44 | [2] 8 | 10 | 10 | 8–9 |
| Example 5 [3] | 1.00 | [4] 8 | 10 | 10 | 7 |

[1] Pre-added urea compound.
[2] Few.
[3] Post added urea compound.
[4] Medium dense.

The pre-addition of the urea compound provides emulsions products which are superior to post additive urea emulsions in scrub resistance, blister resistance and wet adhesion.

There are many techniques which can be utilized for the addition of the water soluble urea compounds. These include separate feed addition with the monomer addition; mixing with the monomers or pre-emulsions; adding prior to the addition of the monomers and the like. It appears to be significant that when the amino resin is added before or during the polymerization, improved emulsions are obtained when compared to post addition and especially with no amino resin additive at all.

It is to be understood that the foregoing description is merely illustrative of preferred embodiments of the invention of which many variations may be made by those skilled in the art within the scope of the following claims without departing from the spirit thereof.

What is claimed is:

1. A process for producing an improved aqueous emulsion for blister resistant paints which comprises:
   (A) interpolymerizing in water at a temperature of about 25° C. to 100° C. in the presence of a catalytic amount of a free radical polymerization catalyst, a surfactant and a water soluble urea formaldehyde condensate, monomers comprising
      (i) an alkyl ester of a polymerizable alpha beta unsaturated mono carboxylic acid having the formula:

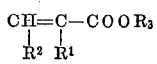

wherein $R^1$ and $R^2$ are hydrogen or $C_1$–$C_2$ alkyl and $R^3$ is $C_1$–$C_{10}$ alkyl; and
      (ii) a polymerizable alpha beta monoethylenically unsaturated mono, di or tri carboxylic acid or anhydride containing only carbon, hydrogen and oxygen or carbon, hydrogen, oxygen and a halogen
   wherein said interpolymer is capable of continuous film formation at 40° C. and below; and
   (B) adjusting the emulsion to a pH in the range of from about 7 to about 10.

2. The process of claim 1 wherein said alkyl ester and said polymerizable acid are interpolymerized with a monomer containing a single polymerizable $CH_2=C<$ group and selected from $C_{10}$–$C_{22}$ alkyl acrylates or methacrylates, vinyl alcohol derivatives, allyl esters of saturated monocarboxylic acids, aliphatic vinyl ethers, dialkyl esters of monoethylenically unsaturated dicarboxylic acids, vinyl aromatic compounds, acrylonitrile, methacrylonitrile, substituted and unsubstituted amides of acrylic or methacrylic acid and their aldehyde condensates, aminoalkyl acrylates and methacrylates and hydroxy alkyl acrylates and methacrylates.

3. The process of claim 1 wherein said interpolymerization is carried out at about 50° C. to 75° C. and wherein said pH is adjusted to about 8 to 10.

4. The process of claim 1 wherein said monomers are simultaneously added over a period of time.

5. The process of claim 4 wherein said monomers are added in the form of a pre-emulsion.

6. The process of claim 1 wherein said polymerizable acid is selected from acids having the general formula:

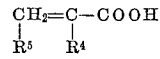

wherein $R^4$ is hydrogen or $C_1$–$C_2$ alkyl and $R^5$ is hydrogen, $C_1$–$C_2$ alkyl or

7. The process of claim 1 wherein (i) is a mixture of butyl acrylate and methyl methacrylate, (ii) is methacrylic acid and the urea formaldehyde condensate is dihydroxy dimethylol ethylene urea.

8. The process of claim 1 wherein (i) is a mixture of ethyl acrylate and methyl methacrylate, (ii) is methacrylic acid and the urea formaldehyde condensate is dihydroxy dimethylol ethylene urea.

References Cited

UNITED STATES PATENTS

| 2,978,433 | 4/1961 | Hurwitz | 260—851 |
| 3,423,349 | 1/1969 | Gagliardi | 260—29.4 U |
| 3,033,811 | 5/1962 | Brown et al. | 260—29.4 U |
| 3,206,421 | 9/1965 | Victorious | 260—29.4 U |

FOREIGN PATENTS

| 843,139 | 8/1960 | Great Britain | 260—851 |

JULIUS FROME, Primary Examiner

H. MINTZ, Assistant Examiner

U.S. Cl. X.R.

260—29.6 HN, 851